(12) United States Patent
Hayes et al.

(10) Patent No.: US 6,860,060 B2
(45) Date of Patent: Mar. 1, 2005

(54) DUMPSTER RODENT CONTROL SYSTEM

(76) Inventors: Douglas C. Hayes, 73 N. Truro St., Hull, MA (US) 02045; Jonathan M. Boyar, 8-10 Howell St., #6, Dorchester, MA (US) 02125

( * ) Notice: Subject to any disclaimer, the term of this patent is extended or adjusted under 35 U.S.C. 154(b) by 0 days.

(21) Appl. No.: 10/419,292

(22) Filed: Apr. 21, 2003

(65) Prior Publication Data

US 2004/0205994 A1 Oct. 21, 2004

(51) Int. Cl.⁷ .................... A01M 23/00; A01M 25/00
(52) U.S. Cl. .................. 43/58; 43/131; 43/81; 43/120
(58) Field of Search .................. 43/58, 131, 81, 43/120

(56) References Cited

U.S. PATENT DOCUMENTS

| | | | | |
|---|---|---|---|---|
| 1,223,525 A | * | 4/1917 | Schallman | 43/120 |
| 1,223,873 A | * | 4/1917 | Hartt | 43/120 |
| 1,350,402 A | * | 8/1920 | Cereghino | 43/120 |
| 1,597,236 A | * | 8/1926 | Lee | 43/120 |
| 1,943,177 A | * | 1/1934 | Harris | 43/66 |
| 1,955,496 A | * | 4/1934 | Harris | 43/120 |
| 2,252,812 A | * | 8/1941 | McAnlis | 43/120 |
| 2,297,193 A | * | 9/1942 | Silverman | 43/120 |
| 2,332,334 A | * | 10/1943 | Morrison | 43/81 |
| 2,445,980 A | * | 7/1948 | Tsai et al. | 43/77 |
| 2,501,282 A | * | 3/1950 | Lundquist | 43/69 |
| 2,964,871 A | * | 12/1960 | Hoffman | 43/131 |
| 2,997,022 A | * | 8/1961 | Kay | 43/131 |
| 3,488,879 A | * | 1/1970 | Laughlin | 43/131 |
| 3,661,326 A | * | 5/1972 | Wilson | 43/120 |
| 4,228,613 A | * | 10/1980 | Kalnasy et al. | 43/131 |
| 4,364,194 A | * | 12/1982 | Clark, Sr. | 43/131 |
| 4,453,337 A | * | 6/1984 | Williams | 43/131 |
| 4,541,198 A | * | 9/1985 | Sherman | 43/131 |
| 4,566,218 A | * | 1/1986 | Kurosawa et al. | 43/58 |
| 4,570,377 A | * | 2/1986 | Primavera | 43/131 |
| 4,611,426 A | * | 9/1986 | Willis | 43/131 |
| 4,619,071 A | * | 10/1986 | Willis | 43/131 |
| 4,625,452 A | * | 12/1986 | Knote | 43/131 |
| 4,630,392 A | * | 12/1986 | Ferraro | 43/131 |
| 4,648,201 A | * | 3/1987 | Sherman | 43/131 |
| 4,658,536 A | * | 4/1987 | Baker | 43/131 |
| 4,730,412 A | * | 3/1988 | Sherman | 43/131 |
| 4,825,581 A | * | 5/1989 | Dailey | 43/131 |
| 4,831,775 A | * | 5/1989 | Sherman | 43/131 |
| 4,835,902 A | * | 6/1989 | Sherman | 43/131 |
| 4,905,407 A | * | 3/1990 | Sherman | 43/131 |
| 4,965,959 A | * | 10/1990 | Gagne | 43/58 |
| 5,083,704 A | * | 1/1992 | Rounthwaite | 43/58 |
| 5,148,624 A | * | 9/1992 | Schmidt | 43/81 |
| 5,218,782 A | * | 6/1993 | Null et al. | 43/120 |
| 5,235,778 A | * | 8/1993 | Sutherlin | 43/61 |
| 5,267,411 A | * | 12/1993 | Phillips et al. | 43/81 |

(List continued on next page.)

FOREIGN PATENT DOCUMENTS

| | | | |
|---|---|---|---|
| GB | 2249249 B1 | * 5/1992 | 43/131 |
| WO | WO-82/03968 A1 | * 11/1982 | 43/131 |

*Primary Examiner*—Darren W. Ark
(74) *Attorney, Agent, or Firm*—John M. Brandt

(57) ABSTRACT

A system for controlling rodents in the vicinity of dumpsters consisting of an assembly of two chambers joined together; the outermost having a rodent entry and exit port and the innermost having the same connecting to the outermost chamber. A rodent control device, either a mechanical trap or a chemical rodenticide coupled with bait is disposed in the innermost chamber. The assembly is positioned at the front and bottom of a dumpster with the innermost chamber forward of the outermost chamber such that when the dumpster is tipped forward for emptying, the rodent control device and any rodents in the innermost chamber will remain within that chamber.

9 Claims, 2 Drawing Sheets

U.S. PATENT DOCUMENTS

| | | | | |
|---|---|---|---|---|
| 5,272,832 A | * | 12/1993 | Marshall et al. | 43/131 |
| 5,446,992 A | * | 9/1995 | Stewart | 43/131 |
| 5,452,539 A | * | 9/1995 | Kurosawa et al. | 43/58 |
| 5,706,601 A | * | 1/1998 | Dail | 43/81 |
| 5,930,944 A | * | 8/1999 | Knuppel | 43/58 |
| 6,082,042 A | * | 7/2000 | Issitt | 43/131 |
| 6,145,242 A | * | 11/2000 | Simpson | 43/131 |
| 6,164,010 A | * | 12/2000 | Snell et al. | 43/131 |
| 6,266,917 B1 | * | 7/2001 | Hight | 43/58 |
| 6,389,738 B1 | * | 5/2002 | Denny et al. | 43/58 |
| 6,397,517 B1 | * | 6/2002 | Leyerle et al. | 43/131 |
| 6,571,509 B2 | * | 6/2003 | Frasier | 43/131 |
| 6,588,141 B1 | * | 7/2003 | Bergeson | 43/131 |

* cited by examiner

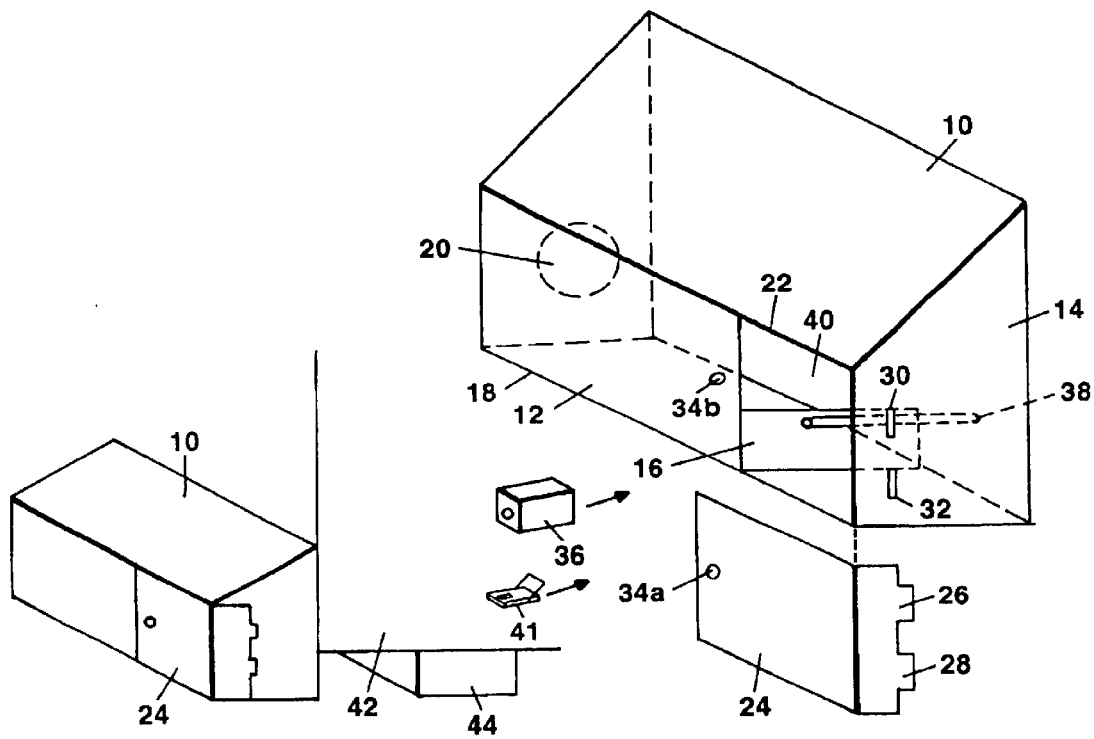
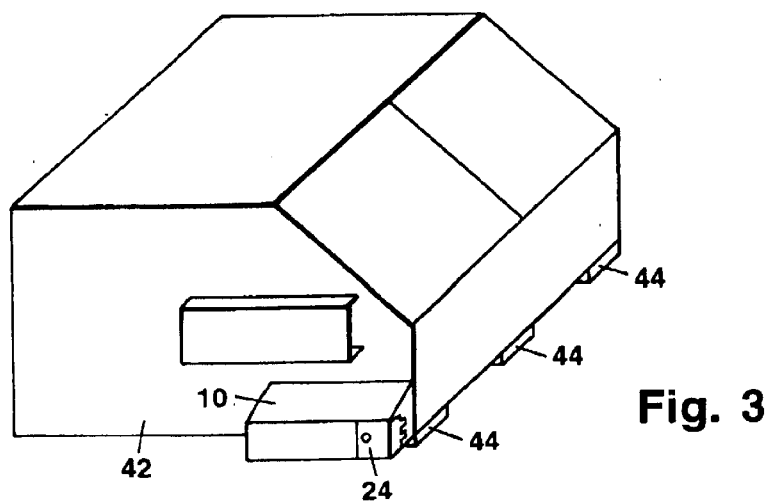
Fig. 2
Fig. 1
Fig. 3

DUMPSTER RODENT CONTROL SYSTEM

BACKGROUND OF THE INVENTION

1. Field of the Invention

The invention resides in the field of rodent control and elimination devices and more particularly relates to a system adapted for use with trash collection dumpsters.

2. Description of the Prior Art

A variety of unique and inventive rodent control devices and methods exist in the prior art. Some are designed to annoy and cause discomfort to the animals concerned and include frequency generators connected to building electrical circuits, sonic generators emitting distressing sound waves, and apparatus for capturing rodents and causing them to vocalize warning cries. Further, there are any number of rodenticides and mechanical traps available for purchase by the general public or professional pest control practioners.

The present invention is specifically concerned with the rodent population generated by and attracted to dumpster type trash containers which are placed in heavily populated areas on the exterior of buildings. Devices used in such areas must be arranged to prevent the public, particularly young children from having access to the baits or mechanical traps used to eliminate rodents and the rodents themselves after their demise. The applicants are unaware of any other rodent control system in the prior art specifically adapted for use with dumpster type trash receptacles.

The system disclosed herein is designed to accomplish the above purpose as well as provide an efficient and inexpensive means for controlling rodents without complicated electrical or mechanical apparatus

SUMMARY OF THE INVENTION

The invention may be summarized as a rodent control system to be used in conjunction with dumpster trash receptacles consisting of a dual chamber assembly mounted either inside or outside the dumpster at the front and bottom. The outermost chamber has a rodent entrance port and the innermost chamber has an entrance port communicating with the outermost chamber. A mechanical trap or bait containing rodenticide is disposed in the innermost chamber which also has a door for removal of captured or poisoned rodents.

The assembly is positioned such that the outermost chamber is behind the innermost chamber with respect to the front of the dumpster. The passageway between the two chambers is raised above the bottom of the device. This arrangement prevents the bait or mechanical trap and any captured or poisoned rodents from falling out of the assembly when the dumpster is tipped upward and forward for emptying.

If the assembly is mounted inside a dumpster, an access hole in one wall of the dumpster must be provided to communicate with the doorway in the innermost chamber to allow removal of dead rodents, resetting of mechanical traps, and/or resupplying bait and rodenticide. Optionally, a hole may be provided in the dumpster near or coincident with the entrance port of the outermost chamber to allow easy access by rodents to the assembly These and other features and advantages of the invention will be more fully understood from the description of the preferred embodiment taken with the drawings which follows.

DESCRIPTION OF THE DRAWINGS

FIG. 1 is a perspective view of the preferred embodiment of the invention;

FIG. 2 is an additional perspective view of a the embodiment of FIG. 1 positioned for use;

FIG. 3 is an additional perspective view of the embodiment of FIG. 2;

DESCRIPTION OF THE PREFERRED EMBODIMENT

Figure 4:
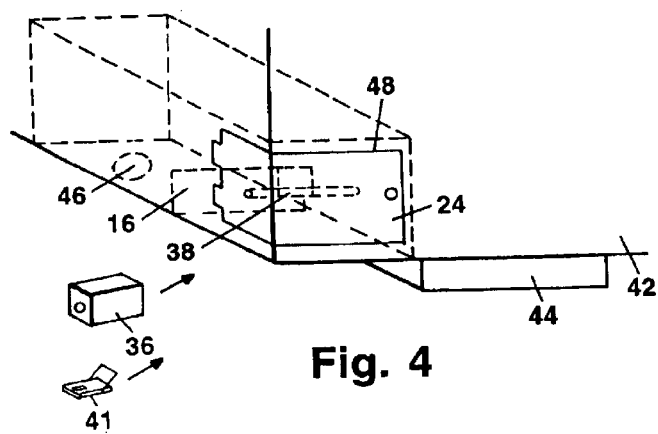
FIG. 4 is a perspective view of an alternative embodiment of the invention.

Referring first to FIG. 1, there is shown a perspective view of the preferred embodiment of the rodent control assembly adapted to be positioned on the exterior of a dumpster trash unit. The assembly consists of a rectangular hollow enclosed structure 10, preferably constructed of sheet metal, divided into two chambers 12 and 14 separated by a partial wall 16 located on the bottom 18 of structure 10.

An access hole 20 is positioned in the first or outer chamber 12 of the assembly to allow ingress and egress of rodents. Access to chamber 14 for the purpose of removing dead rodents or replacing bait and/or resetting mechanical traps is provided by port 22 covered by door 24. Door 24 is shown removed for purposes of clarity and when placed on the assembly as shown in FIG. 2, using hinge extensions 26 and 28 fitted into slots 30 and 32, completely covers port 22. Door 24 may be secured by lock assembly 34a and 34b shown schematically.

Chamber 14 contains either a portion of rodenticide bait 36 which may be mounted on rod 38 attached to back wall 40 or a mechanical trap 41 both shown outside chamber 14 for purposes of clarity.

FIG. 2 illustrates the positioning and mounting of the assembly in relation to a front bottom corner of a dumpster trash disposal unit 42 placed on support members 44, one of which is illustrated.

FIG. 3 shows the assembly as it would appear on the entire dumpster.

Figure 5:
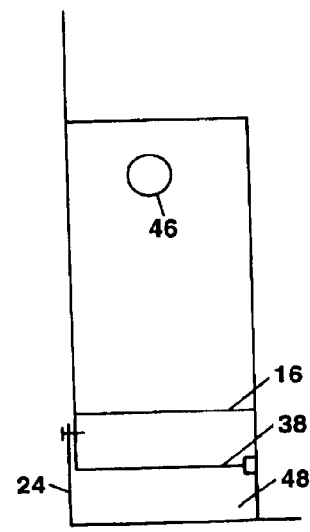
FIG. 5 is a top cross-sectional view of the embodiment of FIG. 4.
Figure 6:
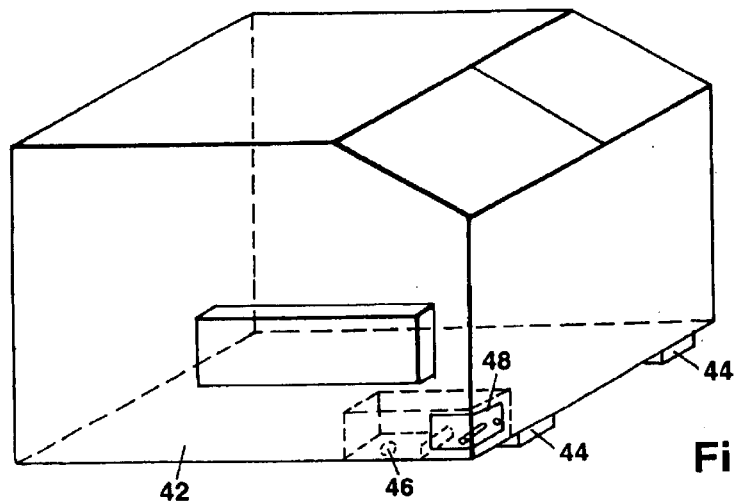
FIG. 6 is an additional perspective view of the embodiment of FIG. 4.

Referring to FIGS. 4, 5, and 6, an assembly identical in concept to that previously described is shown placed within the interior of a dumpster. This embodiment protects the assembly from damage and additionally further limits the possibility of unauthorized access by concealing it's existence and using the dumpster walls as an outer layer of structure.

In this embodiment, the port 46 for the ingress and egress of rodents must be cut in the dumpster as well as the assembly. The same is true for port 48 providing access to the second chamber for bait replacement, mechanical trap resetting, and the removal of dead rodents. Optionally, the appropriate bottom and side portions of the dumpster may serve as structural members of the assembly. Otherwise, the function and arrangement of the components remain the same as the external embodiment previously described.

As variations in the above described embodiment will now be apparent to those skilled in the art, the invention is accordingly defined by the following claims.

What is claimed is:

1. A dumpster rodent control system comprising in combination:
   A. a dumpster comprising walls consisting of a front, back, bottom, top, and two sides;
   B. a rodent control assembly mounted within and positioned at said front and said bottom of said dumpster, said assembly comprising in combination:
      i. an enclosed structure having
         a. a first chamber having a first chamber access port for the ingress and egress of rodents, said dumpster having a first dumpster access port disposed in one of said walls corresponding to and communicating with said first access port;
         b. a second chamber adjacent said first chamber comprising a first end, a top, a bottom, two sides, and a second end having a second chamber access port for the ingress and egress of rodents communicating with said first chamber, said second chamber access port positioned substantially above said second chamber bottom, said first chamber positioned behind said second chamber with respect to said front of said dumpster;
      ii. rodent control means disposed within said second chamber, said second chamber further having a third chamber access port for disposing rodent control means therein and for removing deceased rodents, said dumpster having a second dumpster access port disposed in one of said walls corresponding to and communicating with said third chamber access port; and
      iii door means for accessing said second chamber from the exterior of said dumpster and for sealing said second dumpster access port and said third chamber access port wherein upon tipping said dumpster upward from said back of said dumpster, said rodents and said rodent control means will be prevented from falling out of said second chamber.

2. The system of claim 1 wherein said rodent control means comprises a block of poisoned bait.

3. The system of claim 2 further including means to secure said block in said second chamber.

4. The system of claim 1 wherein said rodent control means comprises a mechanical trap.

5. The system of claim 1 wherein said door means is attached to said dumpster.

6. A method for controlling rodents in the vicinity of a dumpster comprising in combination:
   A. providing a dumpster comprised of walls consisting of a front, back, bottom, top, and two side walls;
   B. providing a rodent control assembly mounted within and positioned at said front wall and said bottom wall of said dumpster, said assembly comprising in combination:
      i. an enclosed structure having:
         a. a first chamber having a first chamber access port for the ingress and egress of rodents, said dumpster having a first dumpster access port disposed in one of said walls corresponding to and communicating with said first chamber access port,
         b. a second chamber adjacent said first chamber comprising a first end, a top, a bottom, two sides, and a second end having a second chamber access port for the ingress and egress of rodents communicating with said first chamber, said second chamber access port positioned above said second chamber bottom, said first chamber positioned behind said second chamber with respect to said front of said dumpster, said second chamber further having a third chamber access port for disposing rodent control means therein and for removing deceased rodents, said dumpster having a second dumpster access port disposed in one of said walls corresponding to and communicating with said third chamber access port, and
      ii. door means for accessing said second chamber from the exterior of said dumpster and for sealing said second dumpster access port and said third chamber access port wherein upon tipping said dumpster upward from said back of said dumpster, said rodents and said rodent control means be prevented from falling out of said second chamber; and
   c. providing rodent control means and disposing said rodent control means within said second chamber.

7. The method of claim 6 wherein said rodant control means comprises a block of poisoned bait.

8. The method of claim 7 further including means to secure said block in said second chamber.

9. The method of claim 6 wherein said rodent control means comprises a mechanical trap.

* * * * *